(12) United States Patent
Lee et al.

(10) Patent No.: US 8,259,092 B2
(45) Date of Patent: Sep. 4, 2012

(54) METHOD FOR WRITING MOTION AND TRAJECTORY RECOGNITION AND WRITING APPARATUS AND RECOGNIZING SYSTEM

(75) Inventors: Gwo-Yun Lee, Hsinchu County (TW); Hsuan-Lih Lin, Kaohsiung (TW); Fang-Chen Chuang, Tainan County (TW)

(73) Assignee: Industrial Technology Research Institute, Hsinchu (TW)

( * ) Notice: Subject to any disclaimer, the term of this patent is extended or adjusted under 35 U.S.C. 154(b) by 894 days.

(21) Appl. No.: 12/355,241

(22) Filed: Jan. 16, 2009

(65) Prior Publication Data

US 2009/0295758 A1    Dec. 3, 2009

(30) Foreign Application Priority Data

May 27, 2008   (TW) ................................ 97119468 A

(51) Int. Cl.
*G06F 3/043*    (2006.01)
(52) U.S. Cl. ......... 345/179; 345/177; 345/158; 345/175
(58) Field of Classification Search ........................ None
See application file for complete search history.

(56) References Cited

U.S. PATENT DOCUMENTS

| 5,294,792 | A  | * | 3/1994  | Lewis et al. ................... 250/221 |
| 6,348,914 | B1 | * | 2/2002  | Tuli ................................. 345/179 |
| 6,603,464 | B1 | * | 8/2003  | Rabin ............................ 345/179 |
| 6,628,847 | B1 |   | 9/2003  | Kasabach et al. |
| 7,068,806 | B2 |   | 6/2006  | Walsh |
| 2004/0184659 | A1 | | 9/2004 | Bang et al. |
| 2006/0088215 | A1 | | 4/2006 | Milner |
| 2006/0161992 | A1 | * | 7/2006 | Kempf ............................ 726/34 |
| 2006/0269168 | A1 | * | 11/2006 | Kasabach et al. ............. 382/314 |
| 2008/0048988 | A1 | | 2/2008 | Qi |

FOREIGN PATENT DOCUMENTS

TW          490643          6/2002

OTHER PUBLICATIONS

Towards an ubiquitous wireless digital writing instrument using MEMS motion sensing technology Guanglie Zhang et al. Advanced Intelligent Mechatronics. Proceedings, 2005 IEEE/ASME International Conference on Jul. 24-28, 2005.
China patent office action issued on Nov. 4, 2010.
Taiwan patent office action issued on May 29, 2012.

* cited by examiner

*Primary Examiner* — Van Chow
(74) *Attorney, Agent, or Firm* — WPAT, PC; Justin King

(57) ABSTRACT

The present invention provides a method for writing motion recognition, wherein a sound signal generated when a writing apparatus is contacting and moving on a writing surface is acquired. According to the occurrence of the sound signal, the writing apparatus can be determined whether it is on the writing surface or not. In another embodiment, the present invention further provides a method for writing trajectory recognition, wherein the foregoing method and character recognition techniques are combined to convert a writing trajectory into a character. In addition, the present invention further provides a writing apparatus and a recognition system, wherein a device is installed in the writing apparatus for collecting sound signal generated during the writing process and a processing unit which adapts the foregoing method is used to recognize the motion trajectory of the writing apparatus so as to form the corresponding character.

3 Claims, 15 Drawing Sheets

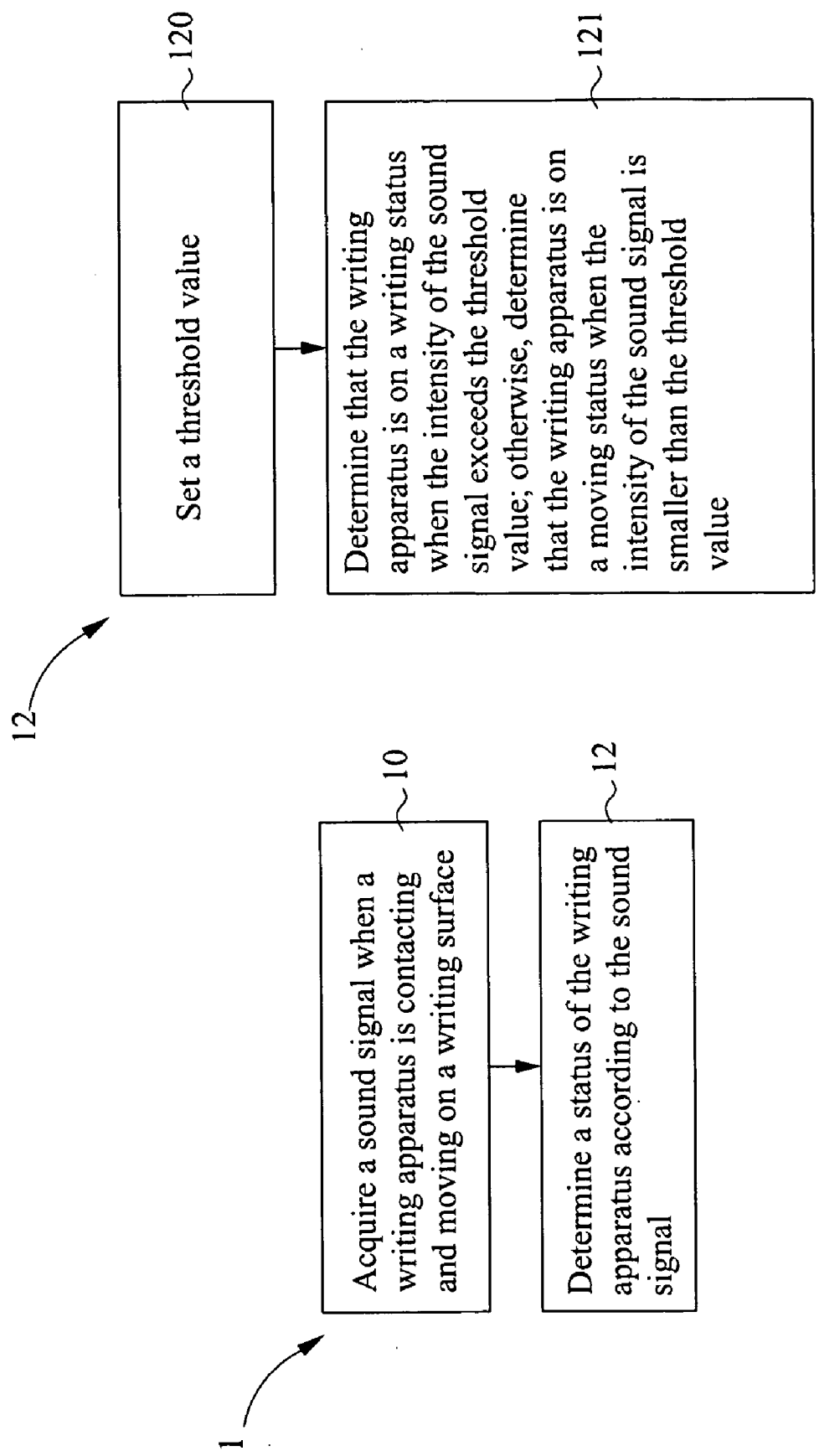

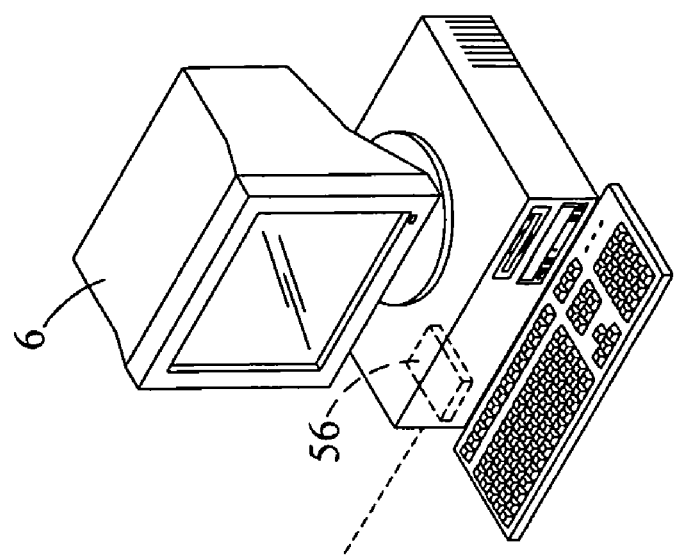
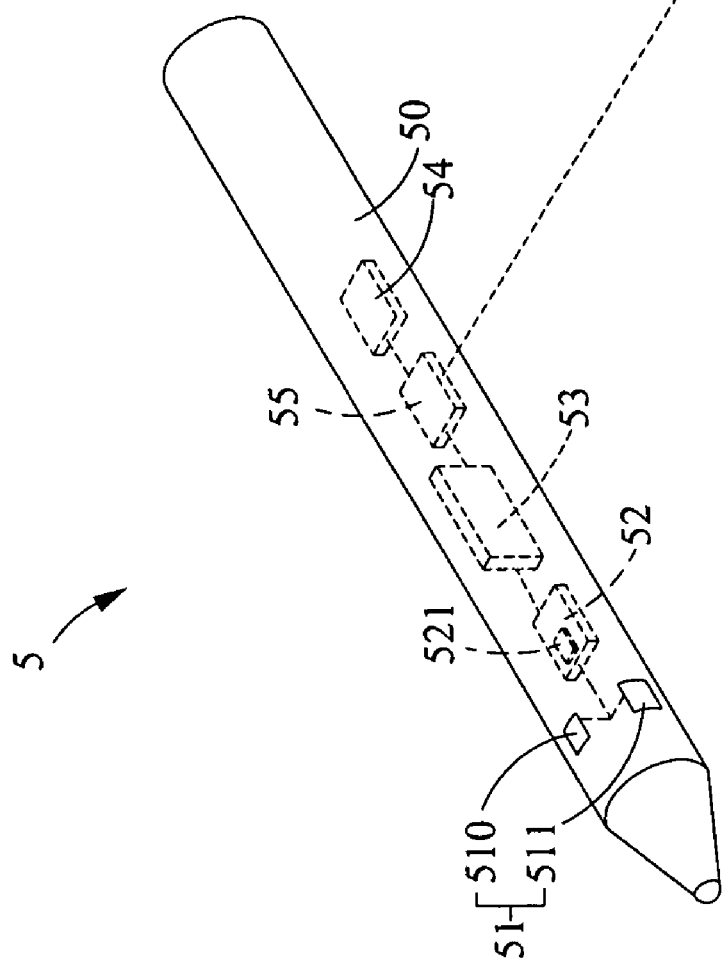
FIG.10A

METHOD FOR WRITING MOTION AND TRAJECTORY RECOGNITION AND WRITING APPARATUS AND RECOGNIZING SYSTEM

FIELD OF THE INVENTION

The present invention generally relates to a technology for writing recognition and, more particularly, to a method for writing motion and trajectory recognition and a writing apparatus and a recognition system using a sound signal to determine a writing motion.

BACKGROUND OF THE INVENTION

With the advancement in technology, the modern life is closely connected with information technology products. Among them, computers and handsets are especially used in the daily life. The user uses these computers technology products to send commands to the computer to show results on the display after the commands have been processed and/or transferred. In such a process, an input interface is required for communicating the user and the computer.

The keyboard and the mouse are the most popular user interfaces. Generally, the mouse is function-limited and cannot process complicated instructions, while the keyboard requires a time-consuming training process. Moreover, it is difficult or time-consuming to realize delicate drawing and processing by using the keyboard or the mouse. Therefore, other input schemes such as handwriting and voice have been developed. On the other hand, with the rapid development in multi-media technology, the technology of the user interface interacted with the multi-media has launched. Generally, the user interface interacted with the multi-media uses a sensor capable of detecting the acceleration or the angular velocity. The development in the technology of determining the start and the end of the sensor has been intensively reported.

In the conventional handwriting technology, for example, U.S. Pat. Pub. No. 2004/0184659, a handwriting trajectory recognition system and method are disclosed. The handwriting trajectory recognition system comprises: a motion detection unit adapted to output electric signals based on changes in acceleration of a body of the system in space and a control unit adapted to detect non-stroke regions intervals where the motions of the system body are temporarily stopped and recover handwritings based on the electric signals.

Moreover, in U.S. Pat. Pub. No. 2006/0088215, a handwriting recognition system using a pressure gauge to detect and determine whether the system is in motion is disclosed. A pressure gauge is disposed at the front of the handwriting recognition system to determine whether the handwriting recognition system contacts the handwriting surface and separate trajectory signals and non-writing signals. The handwriting trajectory is then calculated based on the acceleration and the change-point of the handwriting signal is detected according to the pressure gauge. Moreover, in U.S. Pat. No. 6,628,847, a pressure gauge is disposed on the stylus to determine whether the handwriting recognition system contacts the handwriting surface and separate trajectory signals and non-writing signals.

SUMMARY OF THE INVENTION

The present invention provides a writing motion recognition method capable of detecting a sound signal when a writing apparatus is contacting and moving on a writing surface and determining whether the writing apparatus is on the writing surface or not according to the occurrence of the sound signal.

The present invention provides a writing trajectory recognition method and a writing apparatus and a recognition system using the method capable of recognizing a trajectory signal of the writing status corresponding to a writing trajectory of the writing apparatus to form a character corresponding to the writing status for the trajectory signal.

The present invention provides a writing apparatus and a recognition system, wherein a device is installed in the writing apparatus for collecting sound signal generated during the writing process and a processing unit which adapts the foregoing method is used to recognize the motion trajectory of the writing apparatus so as to form the corresponding character.

In one embodiment, the present invention provides a writing motion recognition method, comprising steps of: acquiring a sound signal generated when a writing apparatus is contacting and moving on a writing surface; and determining a status of the writing apparatus according to the sound signal.

In another embodiment, the present invention further provides a writing trajectory recognition method, comprising steps of: acquiring a sound signal generated when a writing apparatus is contacting and moving on a writing surface; acquiring a continuous electronic signal generated due to motion variation of the writing apparatus; converting the sound signal into a recognition sound signal comprising at least a writing sound signal; comparing the recognition sound signal with the continuous electronic signal; and performing a recognition and composition process on a signal corresponding to a position of the writing sound signal in the continuous electronic signal.

In another embodiment, the present invention further provides a writing apparatus, comprising: a writing body capable of generating a writing motion; a sound collecting device disposed on the writing body and capable of acquiring a sound signal generated when the writing body is contacting and moving on a writing surface; and a sound signal determining unit electrically connected to the sound collecting device and capable of receiving the sound signal to generate a recognition sound signal corresponding to a status of the writing body.

In another embodiment, the present invention further provides a writing recognition system, comprising: a writing body capable of generating a writing motion; a sound collecting device disposed on the writing body and capable of acquiring a sound signal generated when the writing body is contacting and moving on a writing surface; a sound signal determining unit electrically connected to the sound collecting device and capable of receiving the sound signal to generate a recognition sound signal corresponding to a status of the writing body; a motion detection unit capable of acquiring a continuous electronic signal generated due to motion variation of the writing body; a trajectory processing unit capable of comparing the recognition sound signal with the continuous electronic signal to perform a recognition and composition process on a signal corresponding to a position of a writing sound signal in the continuous electronic signal; and a character recognition unit capable of generating a corresponding writing content according to the recognition and composition process.

BRIEF DESCRIPTION OF THE DRAWINGS

The objects, spirits and advantages of various embodiments of the present invention will be readily understood by the accompanying drawings and detailed descriptions, wherein:

FIG. 1A is a flowchart of a writing motion recognition method according to one embodiment of the present invention;

FIG. 1B a flowchart of a step of determining a status of the writing apparatus according to one embodiment of the present invention;

FIG. 10A is a schematic diagram of a writing recognition system according to one embodiment of the present invention;

DETAILED DESCRIPTION OF THE PREFERRED EMBODIMENT

The present invention can be exemplified but not limited by the embodiments as described hereinafter.

Figure 2B:
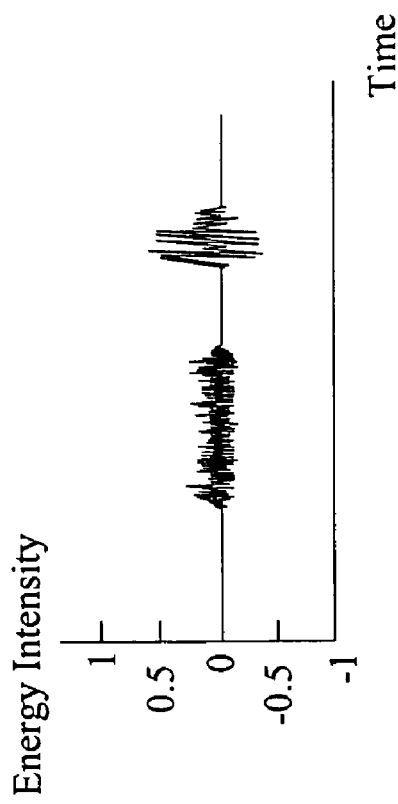
FIG. 2B shows a sound signal after being processed.
Figure 2A:
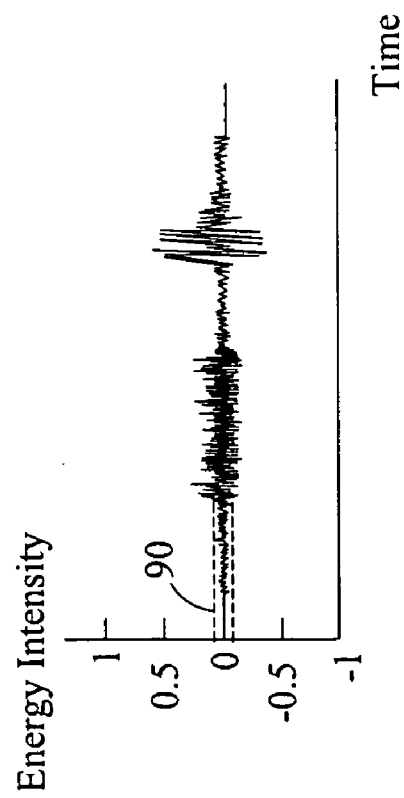
FIG. 2A shows a sound signal as collected.

Please refer to FIG. 1A, which is a flowchart of a writing motion recognition method according to one embodiment of the present invention. In the present embodiment, the writing motion recognition method 1 starts with step 10 to acquire a sound signal generated when a writing apparatus is contacting and moving on a writing surface. In this step, the writing apparatus can be a pen, a finger or other writing tools that a user's hand can hold to write with, and is not limited thereto. When the writing apparatus is used to write, a sound is generated due to friction. Therefore, a sound collecting device is used to collect the sound signal generated when writing. There are various approaches to acquiring the sound in step 10. For example, the sound collecting device can be disposed on the writing apparatus or a writing plate. Alternatively, an external microphone can be used to acquire the sound signal. Then, step 12 is performed to determine a status of the writing apparatus according to the sound signal. Referring to FIG. 2A, a sound signal as collected is shown. The sound signal as collected comprises the sound signal generated due to friction and the sound signal generated when the writing apparatus is moving. Therefore, in this step, signal processing is used to distinguish the sound signal generated when the writing apparatus is writing from the sound signal generated when the writing apparatus is on a non-writing motion status.

Please refer to FIG. 1B, which is a flowchart of a step of determining a status of the writing apparatus according to one embodiment of the present invention. First in step 120, a threshold value is set. The threshold value is determined according to practical demands. Referring to FIG. 2A, it is understood that the signal that does not exceed the threshold value 90 is regarded as a non-writing sound signal. Returning to FIG. 1B, step 121 is performed to determine that the writing apparatus is on a writing status when the intensity of the sound signal exceeds the threshold value or determine that the writing apparatus is on a moving status when the intensity of the sound signal is smaller than the threshold value. After step 121, the signal in FIG. 2A becomes the signal in FIG. 2B, wherein the sound signal generated when the writing apparatus is writing is remained.

Figure 3:
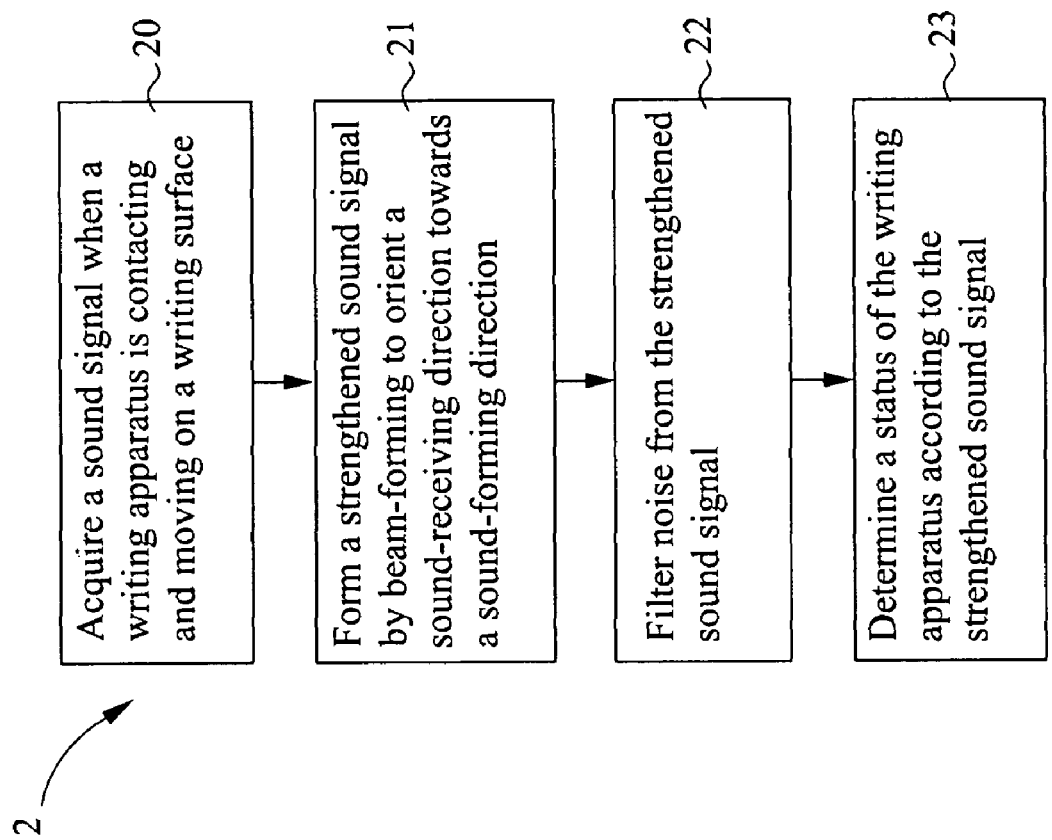
FIG. 3 is a flowchart of a writing motion recognition method according to another embodiment of the present invention.

Please refer to FIG. 3, which is a flowchart of a writing motion recognition method according to another embodiment of the present invention. In the present embodiment, the writing motion recognition method 2 starts with step 20 to acquire a sound signal generated when a writing apparatus is contacting and moving on a writing surface. Then in step 21, a strengthened sound signal is formed by beam-forming to orient a sound-receiving direction towards a sound-forming direction. When the writing apparatus is writing, the sound generated by the writing apparatus and the sound generated due to friction occur. However, environmental noise may appear to interfere. Therefore, in the present embodiment, beam-forming is used to guide the sound-receiving direction towards the sound-forming direction to eliminate errors in the following determining step. In the beam-forming method, the sound signal collected by the array-type sound collecting device is then processed by digital conversion and weighted calculation to perform processing to acquire an output with an adjustable sound-receiving direction. The beam-forming method is conventionally well-known and is usable in signal processing of sound waves, radar waves, etc. and thus the detailed description thereof is not presented herein. Then, in step 22, the strengthened sound signal is filtered to eliminate noise. In this step, to eliminate noise, the strengthened sound signal can be filtered by a band-pass filtered to remove undesired noise. Then, in step 23, a status of the writing apparatus is determined according to the strengthened sound signal. The status is a writing status or a non-writing motion status. Step 23 is similar to step 12, and therefore the description thereof is not presented herein.

Figure 4:
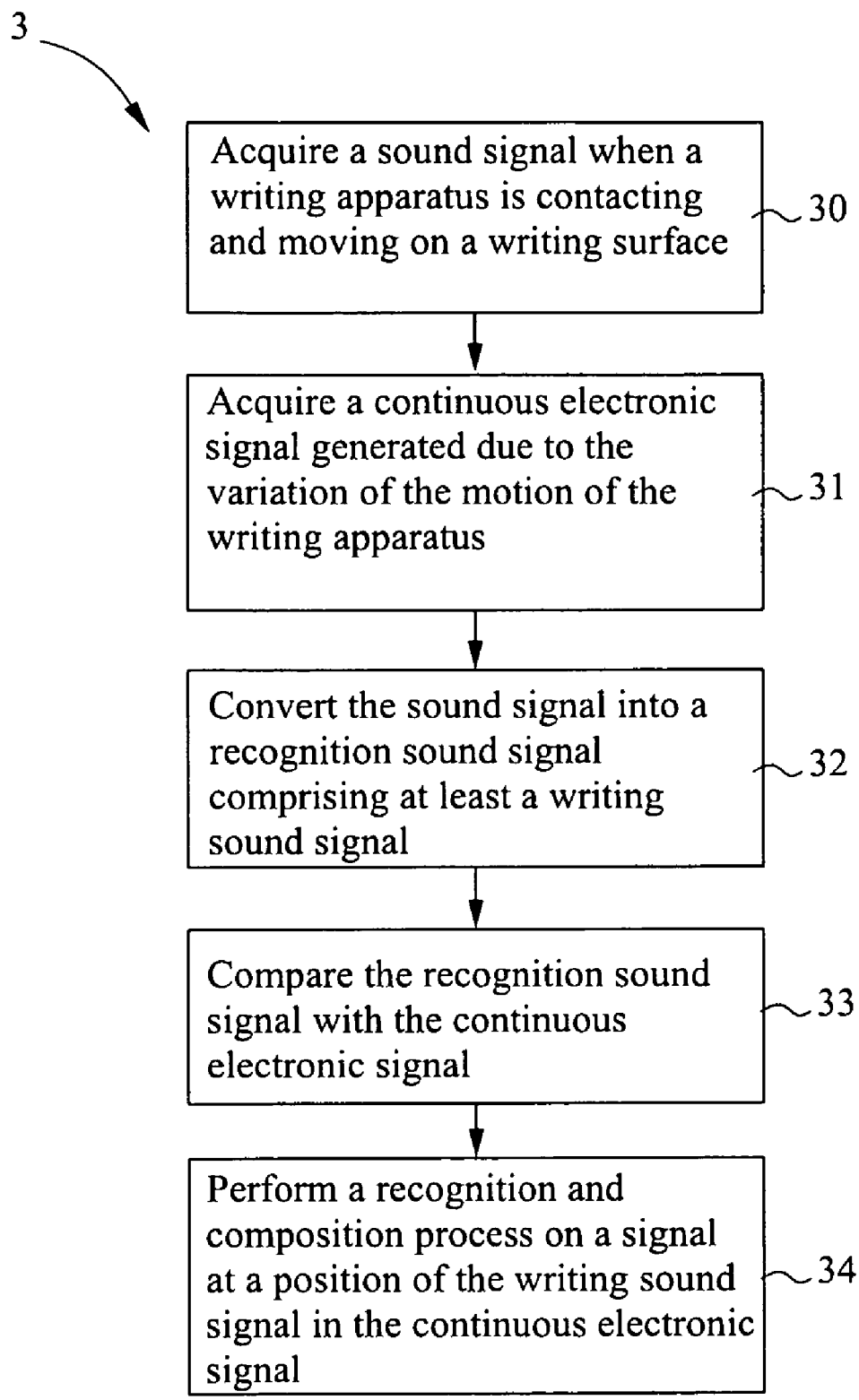
FIG. 4 is a flowchart of a writing trajectory recognition method according to one embodiment of the present invention.

Please refer to FIG. 4, which is a flowchart of a writing trajectory recognition method according to one embodiment of the present invention. In the present embodiment, the aforementioned writing motion recognition method and the writing trajectory recognition of the writing apparatus are combined to determine the written character. The writing trajectory recognition method 3 starts with step 30 to acquire a sound signal when a writing apparatus is contacting and moving on a writing surface. This step is similar to the aforementioned step 10, and thus description thereof is not presented herein. Then in step 31, a continuous electronic signal generated due to the variation of the motion of the writing apparatus is acquired. Since the sound signal in step 30 is only usable as a non-writing basis, step 31 is required to determine the status of the writing apparatus when the writing apparatus is writing so as to perform character recognition.

In step 31, there are various approaches to detecting motion variations of the writing apparatus. For example, a gyroscope, an accelerometer or an image sensor (such as a CCD) is disposed in the writing apparatus. Alternatively, the motion variations of the writing apparatus can be detected by infrared or ultrasonic waves. Then in step 32, the sound signal is converted into a recognition sound signal comprising at least a writing sound signal. The sound signal acquired in step 30 comprises the sound signal generated when the writing apparatus is writing, the sound signal when the writing apparatus is moving and even environmental noise or sound. Therefore, step 32 is similar to the aforementioned steps 21 to 23, wherein beam-forming is used to eliminate noise as in steps 21 and 22 and then a status of the writing apparatus is determined according to the sound signal as in step 23. The status is a writing status or a non-writing motion status. The result of step 32 is similar to the result as shown in FIG. 2B.

Then, step 33 is performed to compare the recognition sound signal with the continuous electronic signal. Since the sound signal and the continuous electronic signal occur simultaneously, the sound signal generated in step 32 can be compared with the continuous electronic signal so as to identify the part of electronic signal being sensed when the writing apparatus is writing.

Figure 6A:
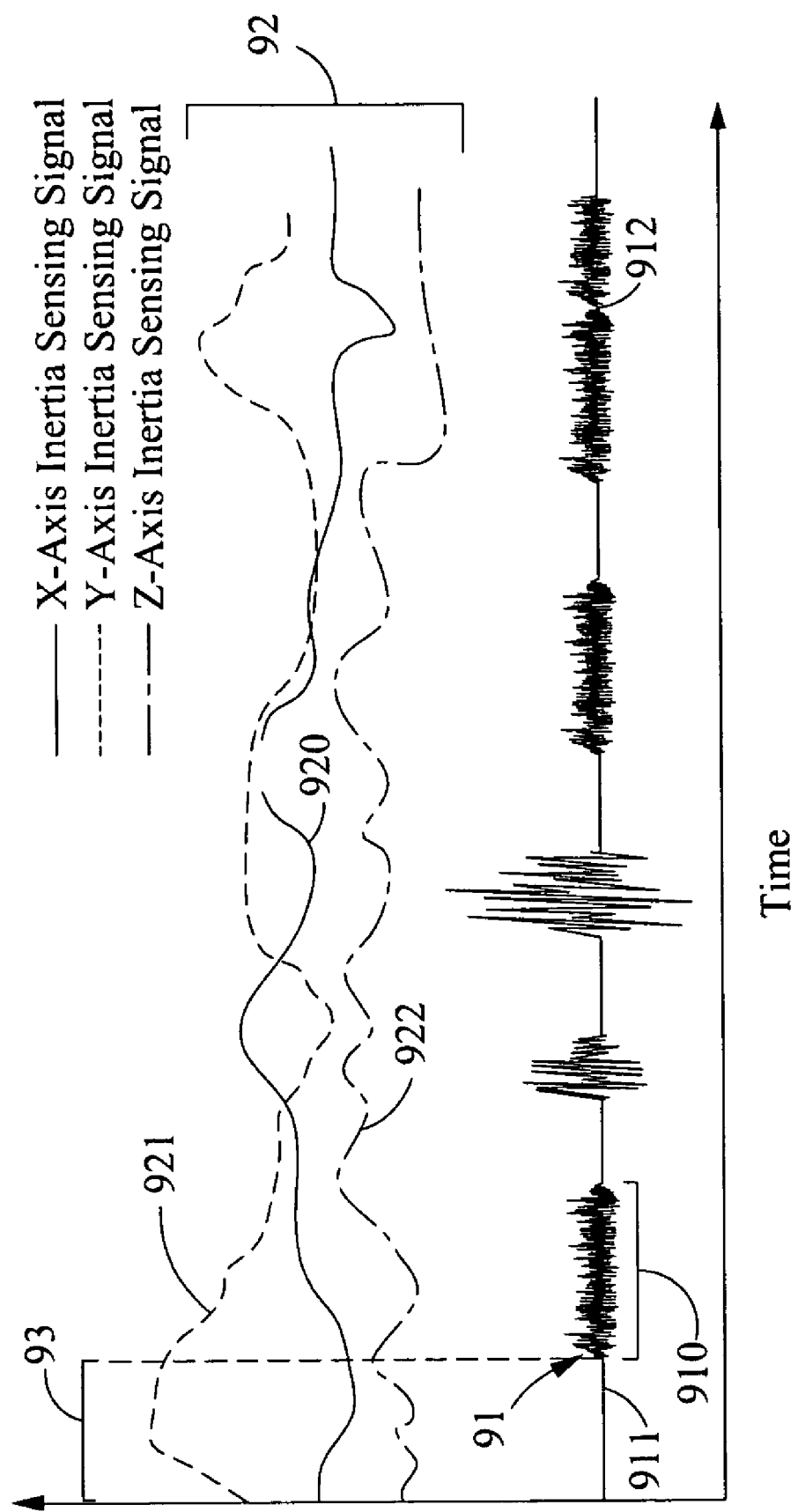
FIG. 6A and FIG. 6B show a sound signal and a continuous electronic signal of the present invention, respectively.
Figure 6B:
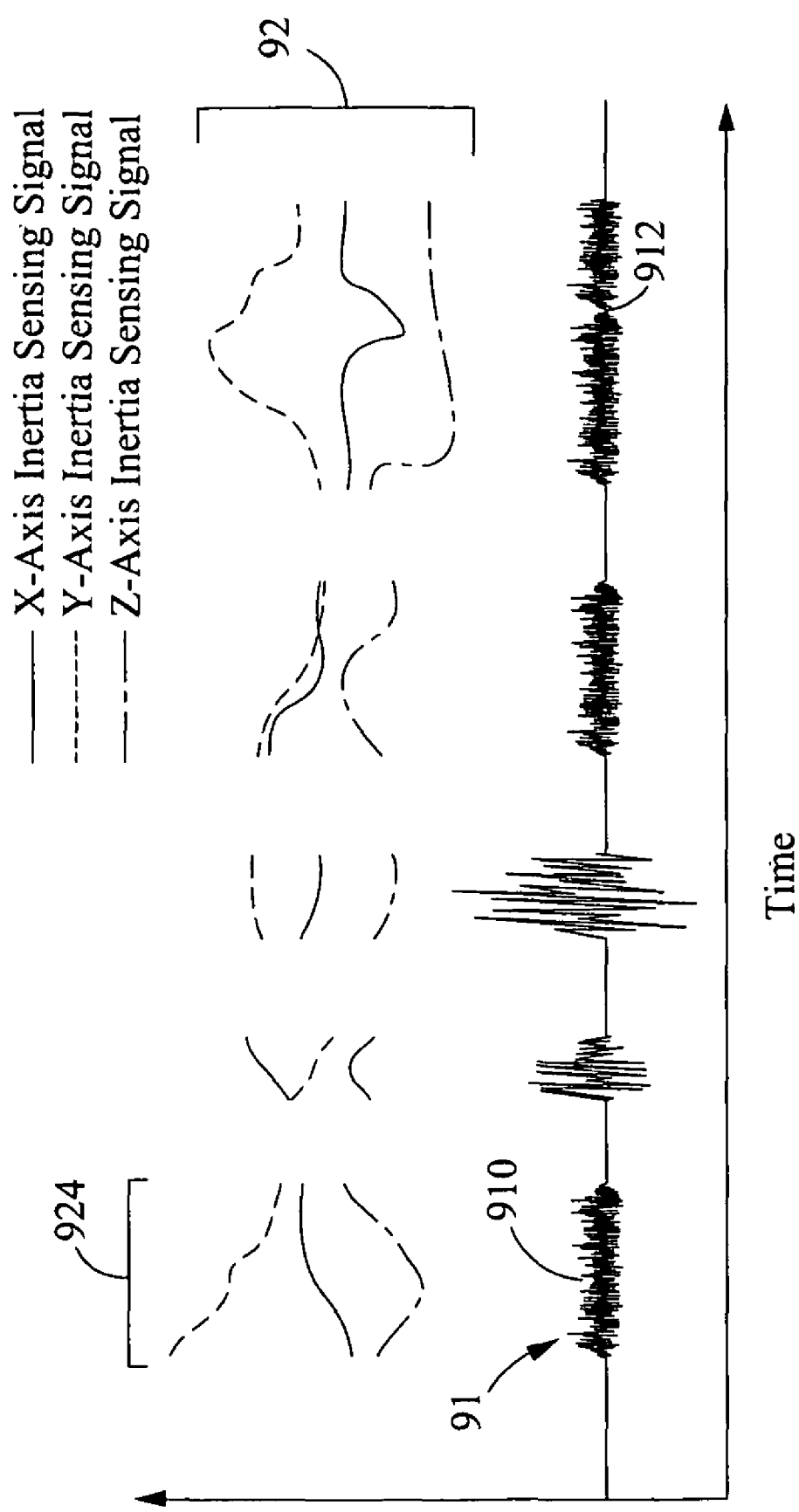

Pleased refer to FIG. 6A and FIG. 6B for a sound signal and a continuous electronic signal of the present invention, respectively. In FIG. 6A, the sound signal 91 comprises a sound signal 910 representing a writing status and a sound signal 911 representing a non-writing status. The continuous electronic signal 92 comprises tri-axial acceleration signals 920, 921 and 922, and is not limited thereto. As the sound signal 91 and the continuous electronic signal 92 are compared, the continuous electronic signal in the region 93 corresponding to the sound signal 911 representing the non-writing status is determined to be invalid. On the contrary, the continuous electronic signal 92 corresponding to the sound signal 910 representing the writing status is determined to be valid. The result of step 33 is as shown in FIG. 6B.

Returning to FIG. 4, in step 34, a recognition and composition process is performed on a signal at a position of the writing sound signal in the continuous electronic signal. The signal at the position of the writing sound signal in the continuous electronic signal corresponds to the continuous electronic signal in the region 924 in FIG. 6B.

Figure 5:
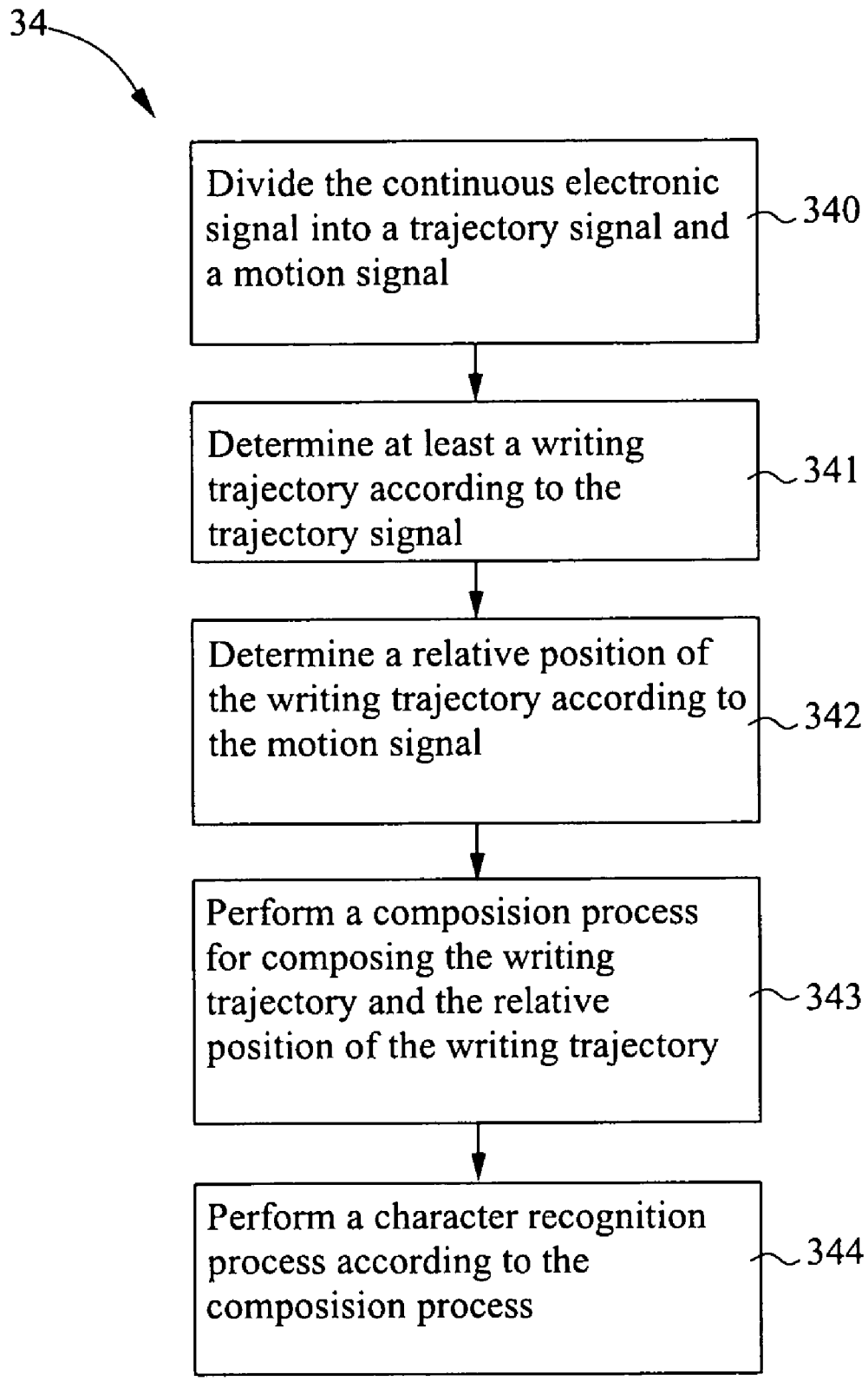
FIG. 5 is a flowchart of a recognition and composition process according to the present invention.

Pleased refer to FIG. 5, which is a flowchart of a recognition and composition process according to the present invention. First, in step 340, the continuous electronic signal is divided into a trajectory signal and a motion signal. The trajectory signal corresponds to the signal corresponding to the position of the writing sound signal and the motion signal corresponds to a position of a non-writing sound signal.

Figure 7A:
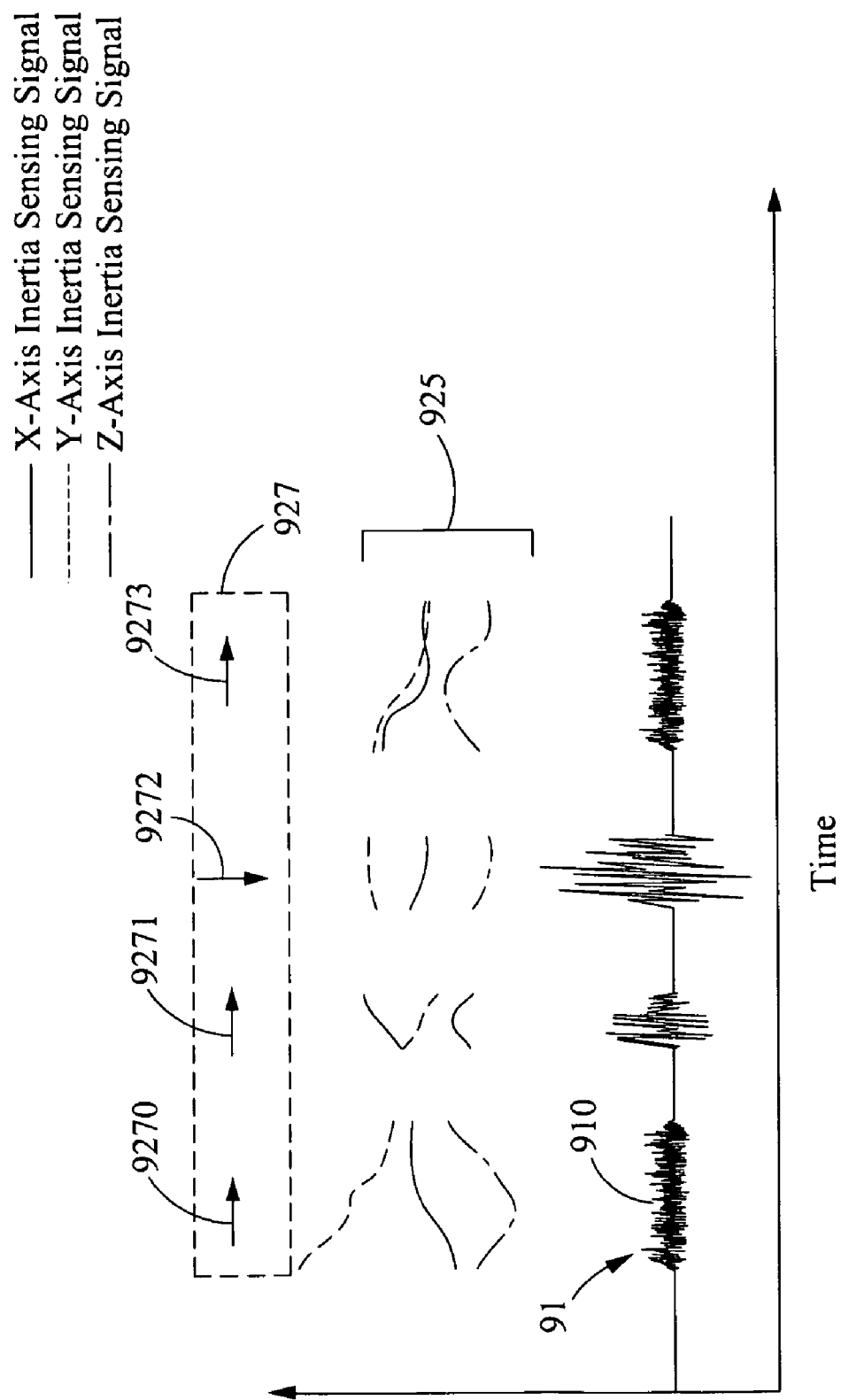
FIG. 7A to FIG. 7C are schematic diagrams of character recognition.
Figure 7B:
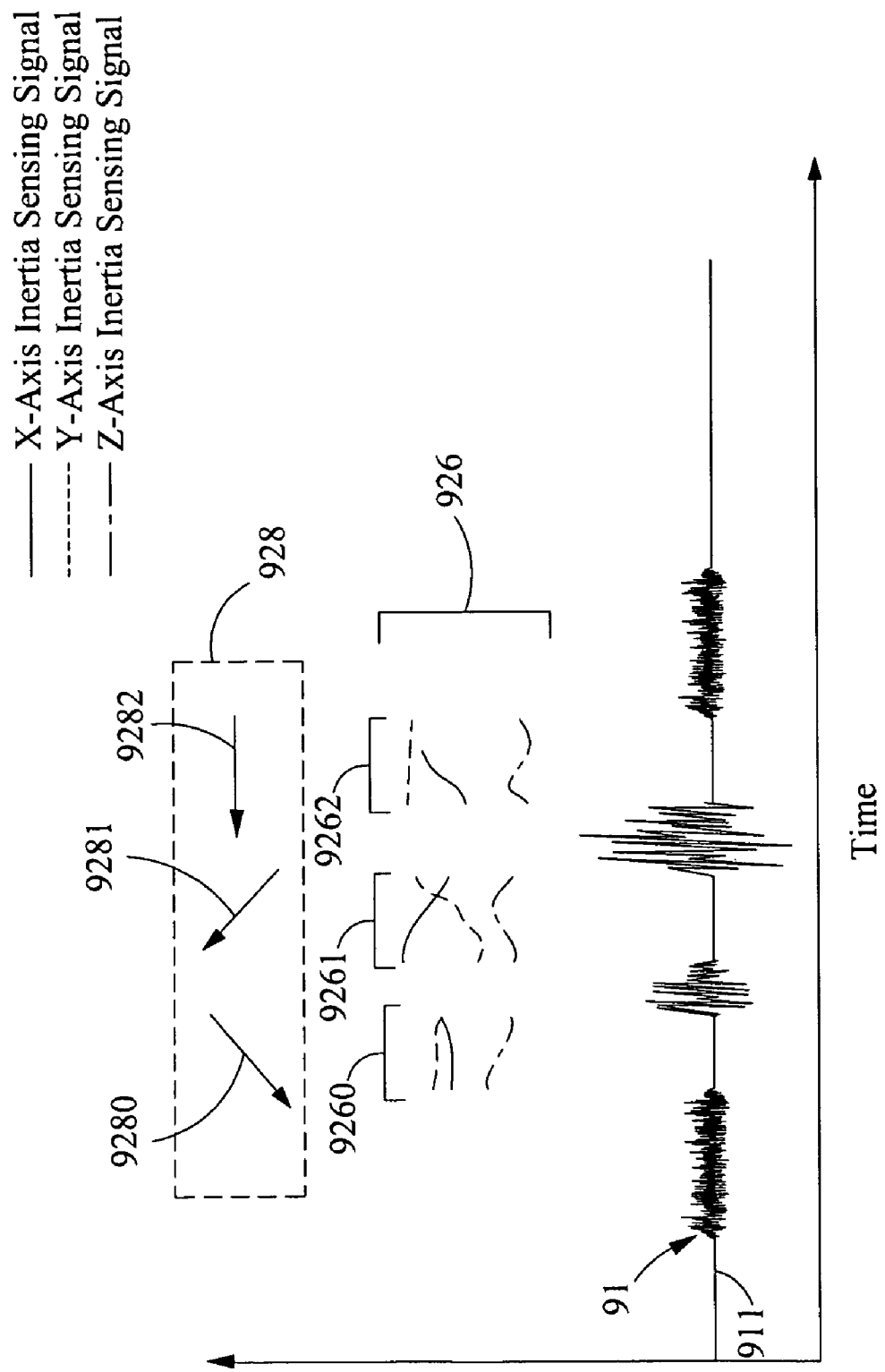

The continuous electronic signal 92 in FIG. 6A is detected by an accelerometer and is divided as shown in FIG. 7A and FIG. 7B. The continuous electronic signal in FIG. 7A corresponds to the trajectory signal 925 in the writing sound signal 910, while the continuous electronic signal in FIG. 7B corresponds to the motion signal 926 in the non-writing sound signal 911.

Returning to FIG. 5, in step 341, at least a writing trajectory is determined according to the trajectory signal. As shown in FIG. 7A, the trajectory is determined from the trajectory signal 925 to analyze the trajectory and direction represented by each electronic signal corresponding to the writing sound signal. The acquired trajectories 9270 to 9273 in region 927 show the result of step 341. Then, in step 342 in FIG. 5, a relative position of the writing trajectory is determined according to the motion signal. As shown in FIG. 7B, the trajectory is determined from the motion signal 926 to analyze the trajectory representing the motion of the adjacent writing trajectories to further determine the relative position of the adjacent writing trajectories. For example, in FIG. 7B, the motion signal 9260 represents an inertia signal generated due to the writing motion between adjacent writing trajectories. Therefore, the moving direction and distance can be determined according to the motion signal 9260 to further analyze the relative position and distance of the motion between the adjacent writing trajectories. In FIG. 7B, relative positions 9280 to 9282 in the region 928 are determined according to step 342.

Returning to FIG. 5, in step 343, a composition process is performed for composing the writing trajectory and the relative position of the writing trajectory. In this step, trajectories 9270 to 9273 and relative positions 9280 to 9282 acquired in FIG. 7A and FIG. 7B are composed to acquire the pattern in FIG. 7C. Since such a pattern does not exhibit any meaning as a character before recognition, step 344 is required to perform character recognition based on step 343 and display the result on a monitor.

Figure 7C:
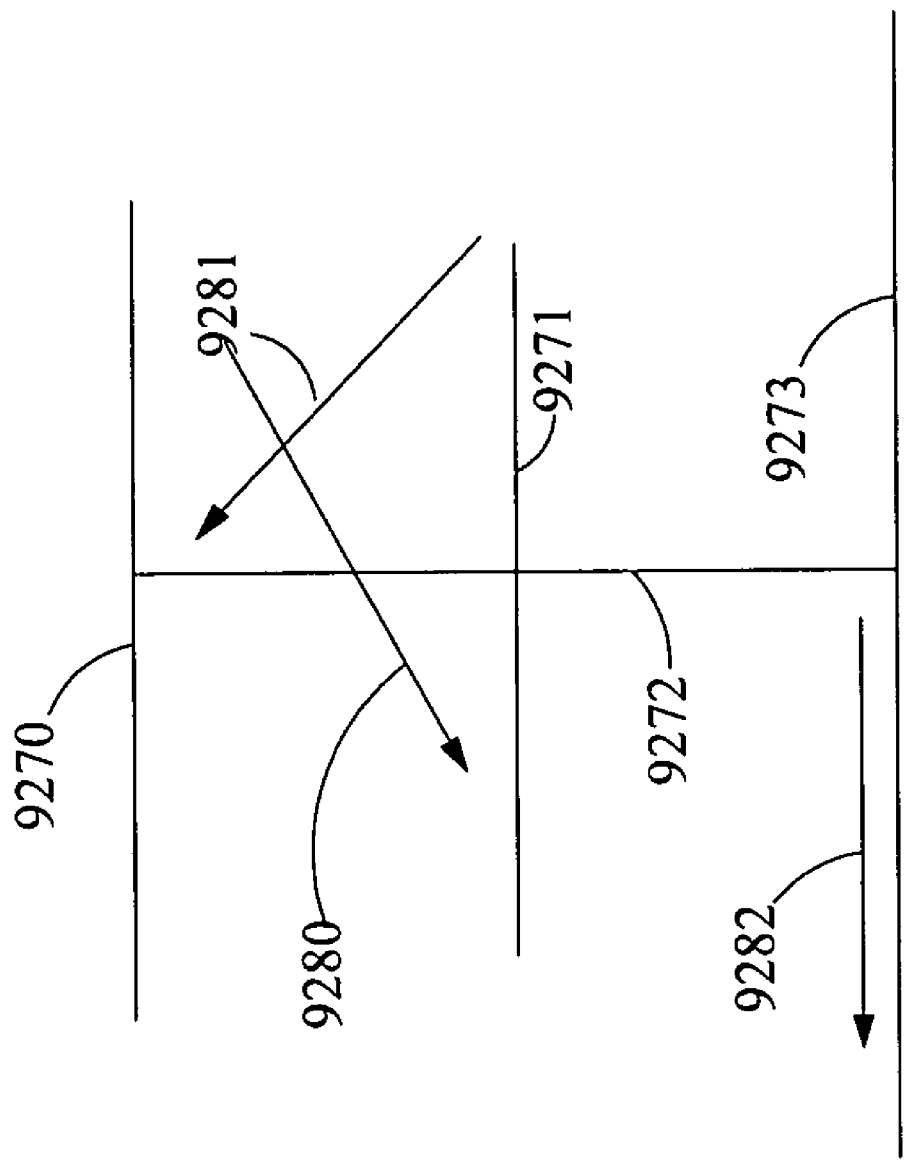
Figure 8:
FIG. 8 is a character with a change point.

FIG. 7A and FIG. 7B show schematic diagrams of character recognition. The trajectory and the trajectory direction corresponding to the writing sound signal as shown in FIG. 7A can be acquired in step 341. Then, the trajectory is recognized in step 342 to form a pattern as shown in FIG. 7C. In step 344, the character " $\pm$ " is recognized. Moreover, there may be a turn in the course of writing. For example in FIG. 8, there is a change point at position 913 when the character "2" is written. Therefore, the sound signal in the present invention also helps to determine the position where the change point takes place to perform character recognition. In FIG. 6B, the position 912 in the sound signal indicates a change point during writing.

Figure 9:
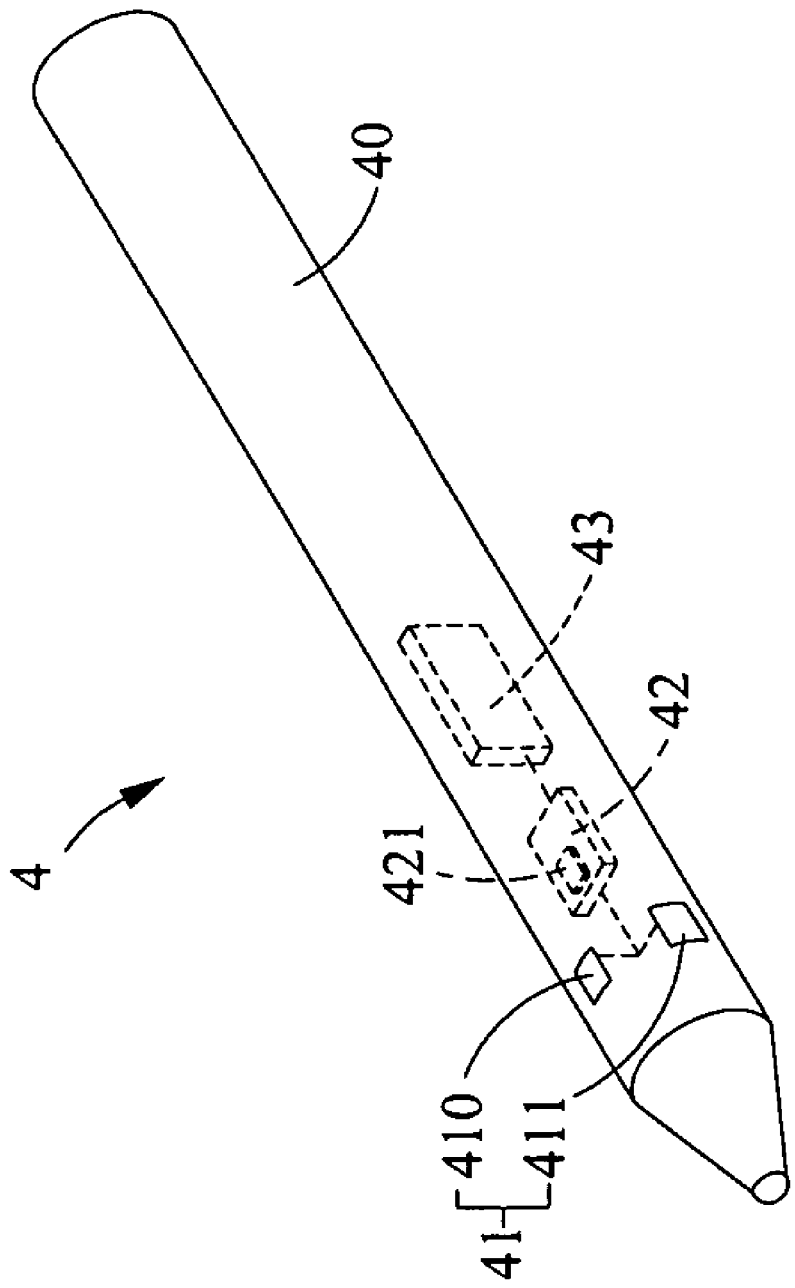
FIG. 9 is a schematic diagram of a writing apparatus according to one embodiment of the present invention.
Figure 11:
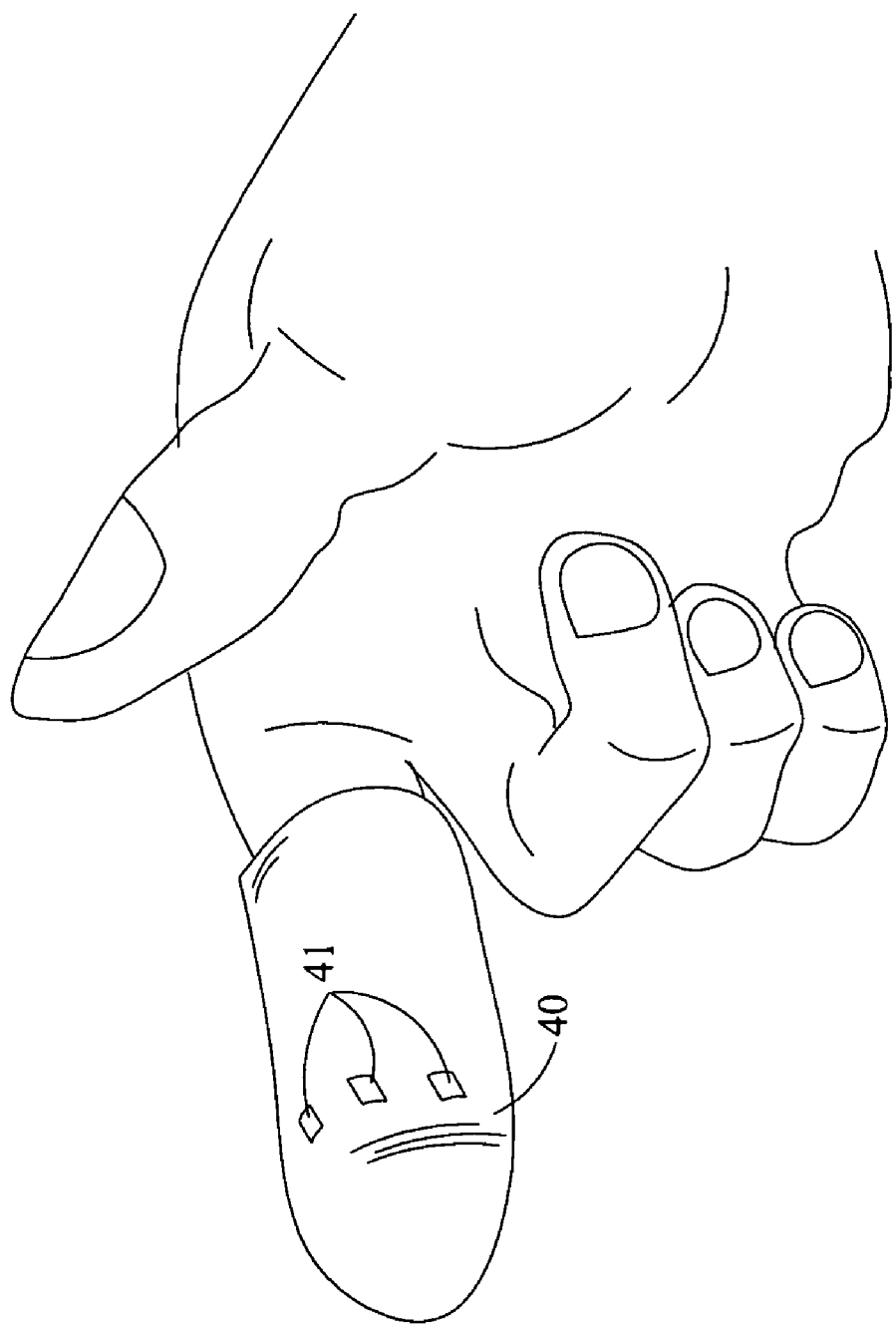
FIG. 11 is a schematic diagram of a writing body according to another embodiment of the present invention.

Please refer to FIG. 9, which is a schematic diagram of a writing apparatus according to one embodiment of the present invention. In the present embodiment, the writing apparatus 4 comprises a writing body 40, a sound collecting device 41, a noise processing unit 42 and a sound signal determining unit 43. The writing body 40 is capable of generating a writing motion. In the present embodiment, the writing body 40 is a pen capable of being held by a hand. In another embodiment, as shown in FIG. 11, the writing body 40 is a sleeve to accommodate a finger. In FIG. 11, the user uses the sleeve as a writing body 40 to write on a writing plate. The sound collecting device 41 is disposed on the writing body 40 so as to acquire the sound signal generated when the writing body 40 is on a writing motion status. The sound collecting device 41 comprises at least one sound collector unit (such as a microphone or a directional microphone). In the present embodiment, the sound collecting device 41 comprises a plurality of microphones 410 and 411. These microphones can be arranged in an array on the writing body 40.

The sound collecting device 41 is connected to a noise processing unit 42 capable of receiving the sound signal generated by the sound collecting device 41 and filtering noise from the sound signal. Moreover, the noise processing unit 42 further comprises a sound orientation control unit 421 with beam-forming so as to guide the sound collecting direction of the sound collecting device 41 towards the writing sound generating direction. Beam-forming is conventionally well-known, and thus description thereof is not presented herein. The sound signal determining unit 43 is electrically connected to the noise processing unit 42 so that the sound signal determining unit 43 is capable of receiving the filtered sound signal to generate a recognition sound signal corresponding to the writing apparatus status. The sound signal determining unit 43 performs processing on the sound signal using step 12 in FIG. 1A or step 23 in FIG. 3 to acquire the recognition sound signal in FIG. 2B. The noise processing unit 42 in the present embodiment is disposed according to practical demands. Even though it is taught, in FIG. 9, the noise processing unit 42 is connected between the sound collecting device 41 and the sound signal processing unit 43, the sound collecting device 41 can also be directly connected to the sound signal processing unit 43.

Figure 10B:
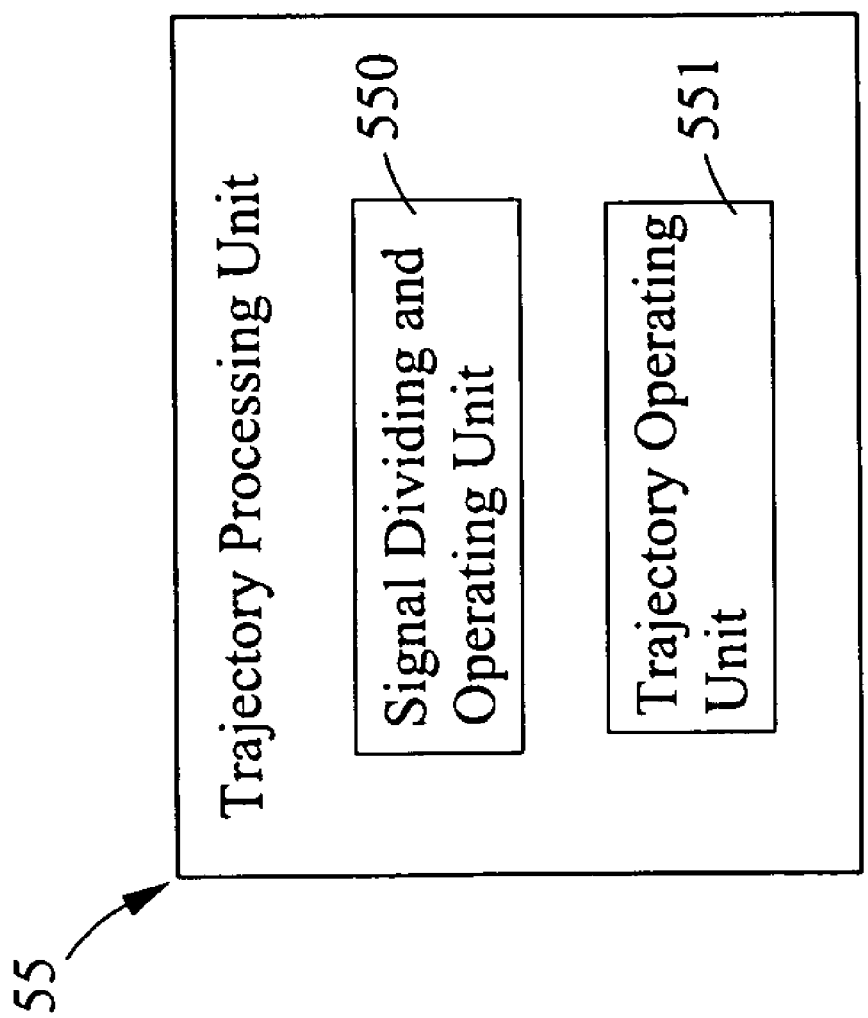
FIG. 10B is a schematic diagram of a trajectory processing unit according to one embodiment of the present invention.

Please refer to FIG. 10A, which is a schematic diagram of a writing recognition system according to one embodiment of the present invention. The writing recognition system 5 comprises a writing body 50, a sound collecting device 51, a noise processing unit 52, a sound signal determining unit 53, a motion detection unit 54, a trajectory processing unit 55 and a character recognition unit 56. In the present embodiment, the writing body 50 is a pen capable of being held by a hand to perform writing on a writing plate. Certainly, the writing body 50 can also be a sleeve to accommodate a finger as shown in FIG. 11. The sound collecting device 51 comprises a plurality of sound collector units 510 and 511 disposed on the writing body. These sound collector units 510 and 511 are capable of being arranged in an array or a ring on the writing body 50. The sound collector units 510 and 511 are directional microphones or microphones. The sound collecting device 51 can acquire the sound signal generated when the writing body 50 is on a writing status.

The noise processing unit 52 is electrically connected to the sound collecting device 51 so as to filter noise from the sound signal acquired by the sound collecting device 51 and orientate the sound direction. The noise processing unit 52 in the present embodiment is similar to the noise processing unit 42 in FIG. 9, and thus description thereof is not presented herein. The sound signal determining unit 53 is electrically connected to the noise processing unit 52 so that the sound signal determining unit 53 is capable of receiving the sound signal and performing processing to generate a recognition sound signal (for example, the sound signal in FIG. 2B) corresponding to the writing body status. The motion detection unit 54 is capable of detecting motion of the writing body to generate a continuous electronic signal. In the present embodiment, the motion detection unit 54 is an inertia sensing unit (such as a gyroscope or an accelerometer), an image sensor (CCD or CMOS) or an ultrasonic wave or infrared sensor. The continuous electronic signal detected by the motion detection unit 54 can be used to acquire the writing trajectory.

The trajectory processing unit 55 is capable of comparing the recognition sound signal with the continuous electronic signal so as to perform recognition and combination on the signal at the position corresponding to at least one writing sound signal in the continuous electronic signal. Please refer to FIG. 10B, which is a schematic diagram of a trajectory processing unit according to one embodiment of the present invention. In the present embodiment, the trajectory processing unit 55 further comprises a signal dividing and operating unit 550 and a trajectory operating unit 551. The signal dividing and operating unit 550 compares the recognition sound signal with the continuous electronic signal compare and divides the continuous electronic signal corresponding to the writing sound signal into at least one sub-electronic signal (as shown in FIG. 6B). The trajectory processing unit 551 combines the at least one sub-electronic signal. The result of the process performed by the trajectory processing unit 551 is as shown in FIG. 7A and FIG. 7B. After the trajectories are combined by the trajectory processing unit 551, the trajectory processing unit 551 transmits the result to the character recognition unit 56. Generally, the character recognition unit 56 is disposed in a computer system 6. The character recognition unit 56 is capable of generating corresponding writing content according to the result of recognition and combination. For example, after the trajectory processing unit 551 combines the trajectories in FIG. 7A to result in the status as shown FIG. 7B, the combination result is then transmitted to the character recognition unit 56 to acquire a character from a character database installed therein. The character is then display on the monitor of the computer system 6.

Returning to FIG. 9, the trajectory processing unit 55 transmits the processed signal to the character recognition unit 56 through wireless or wired transmission. On the other hand, even though the trajectory processing unit 55 of the present invention is disposed on the writing body 50, it can also be disposed in a computer system 6, which is readily understood by anyone with ordinary skill in the art, so that the sound signal determining unit 53 and the motion detection unit 54 transmit the signal to the trajectory processing unit 55 through wireless or wired transmission.

Accordingly, the present invention discloses a writing motion recognition method, a writing trajectory recognition method and a writing apparatus and a recognition system using the method capable of recognizing a trajectory signal of the writing status corresponding to a writing trajectory of the writing apparatus to form a character corresponding to the writing status for the trajectory signal. Therefore, the present invention is useful, novel and non-obvious.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A writing trajectory recognition method, comprising steps of:
    acquiring a sound signal generated when a writing apparatus is contacting and moving on a writing surface;
    acquiring a continuous electronic signal generated due to motion variation of the writing apparatus;
    setting a threshold value;
    determining that the writing apparatus is on a writing status if the sound signal exceeds the threshold value, or determining that the writing apparatus is on a non-writing motion status if the sound signal is smaller than the threshold value;
    converting the sound signal into a recognition sound signal comprising at least a writing sound signal;
    comparing the recognition sound signal with the continuous electronic signal; and
    performing a recognition and composition process on a signal corresponding to a position of the writing sound signal in the continuous electronic signal.

2. The writing trajectory recognition method as recited in claim 1, further comprising a step of filtering noise from the sound signal.

3. A writing trajectory recognition method, comprising steps of:
    acquiring a sound signal generated when a writing apparatus is contacting and moving on a writing surface;
    acquiring a continuous electronic signal generated due to motion variation of the writing apparatus;
    converting the sound signal into a recognition sound signal comprising at least a writing sound signal;
    comparing the recognition sound signal with the continuous electronic signal;
    dividing the continuous electronic signal into a trajectory signal and a motion signal, wherein the trajectory signal corresponds to the signal corresponding to the position of the writing sound signal and the motion signal corresponds to a position of a non-writing sound signal;
    determining at least a writing trajectory according to the trajectory signal;
    determining a relative position of the writing trajectory according to the motion signal;
    performing a composition process to compose the writing trajectory and the relative position of the writing trajectory; and
    performing a text recognition process according to the composition process.

\* \* \* \* \*